Dec. 3, 1940.     G. F. RUOPP     2,223,579
DOUBLE PURPOSE SINGLE POINTER GAUGE
Filed March 18, 1938     3 Sheets-Sheet 1
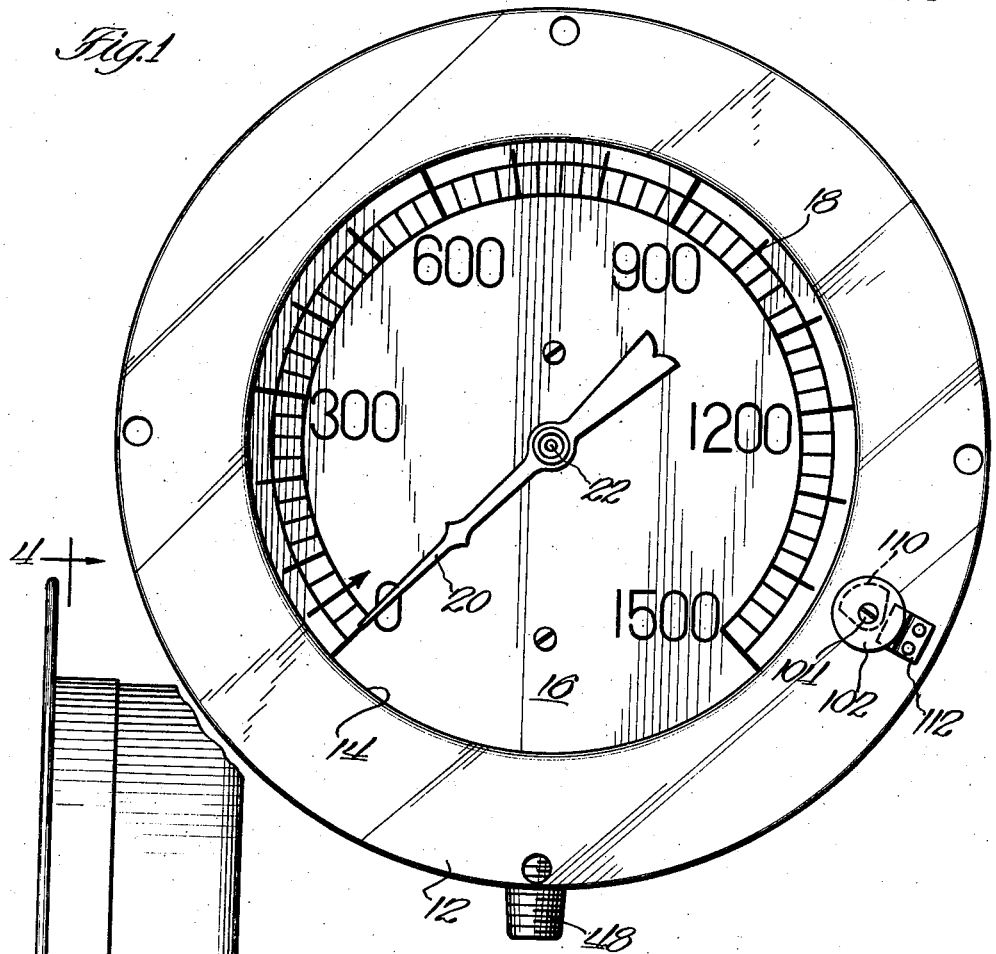
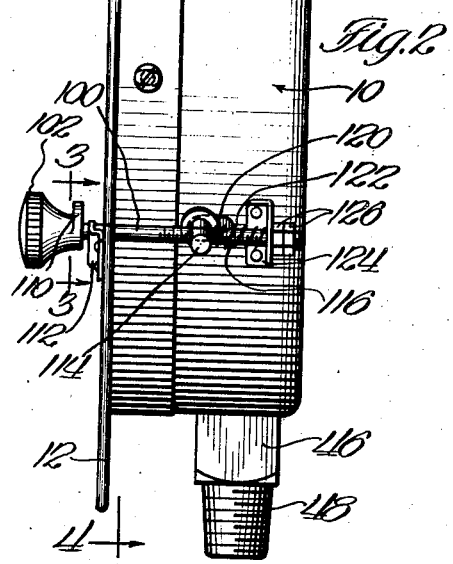
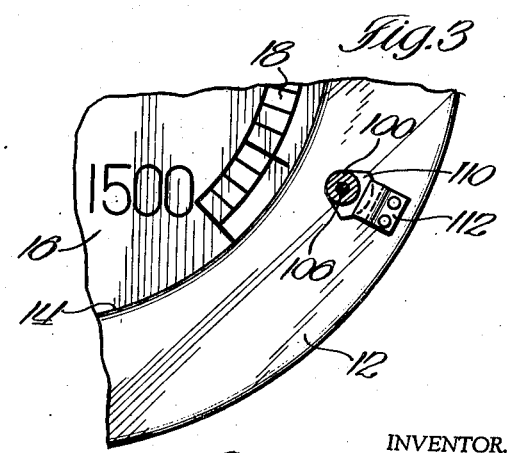
INVENTOR.
George F. Ruopp
BY Harry H. Hitzeman
ATTORNEY.

Dec. 3, 1940.  G. F. RUOPP  2,223,579
DOUBLE PURPOSE SINGLE POINTER GAUGE
Filed March 18, 1938   3 Sheets-Sheet 2
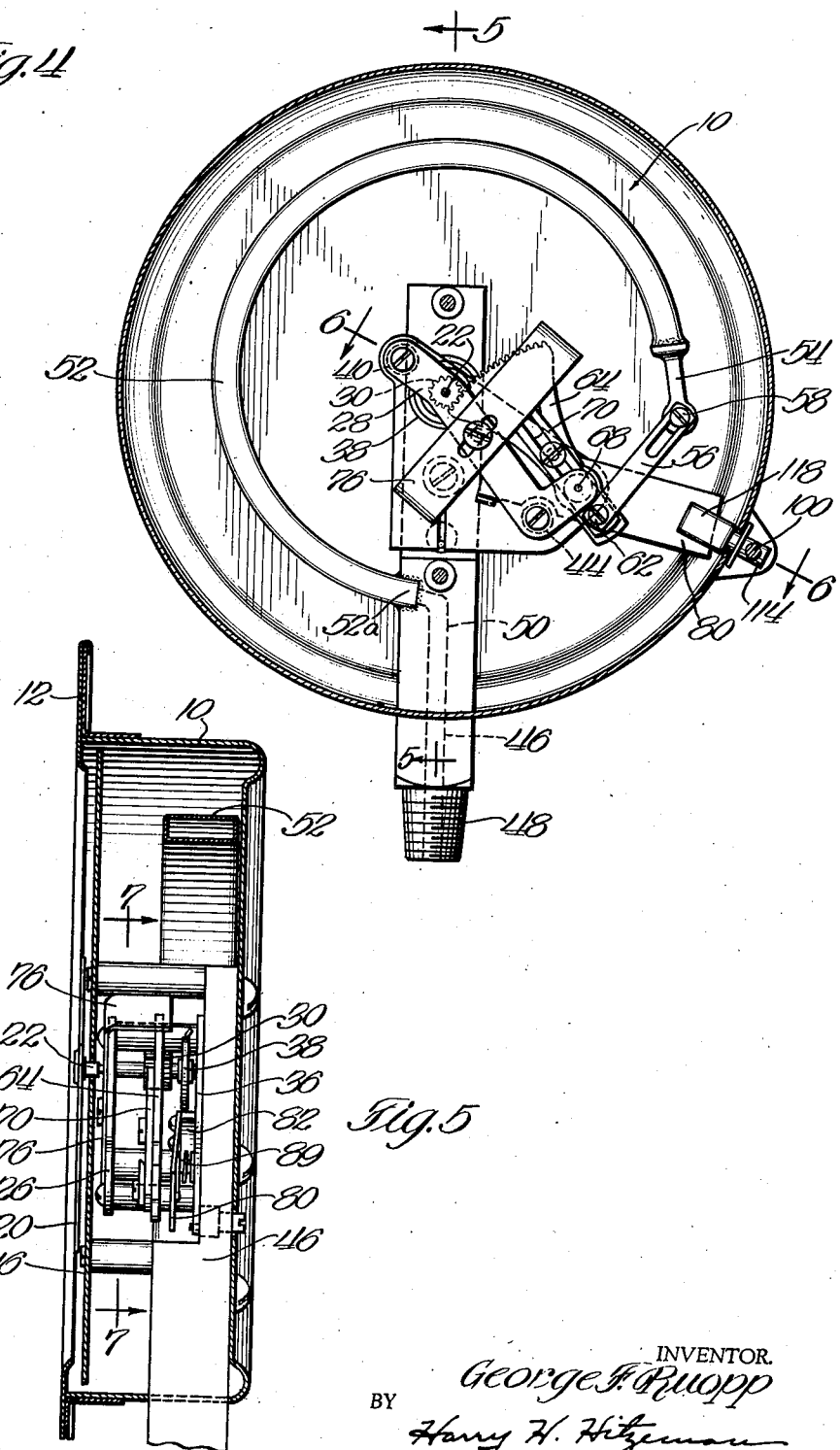
INVENTOR.
George F. Ruopp
BY
Harry H. Hitzeman
ATTORNEY.

Dec. 3, 1940.  G. F. RUOPP  2,223,579
DOUBLE PURPOSE SINGLE POINTER GAUGE
Filed March 18, 1938   3 Sheets-Sheet 3
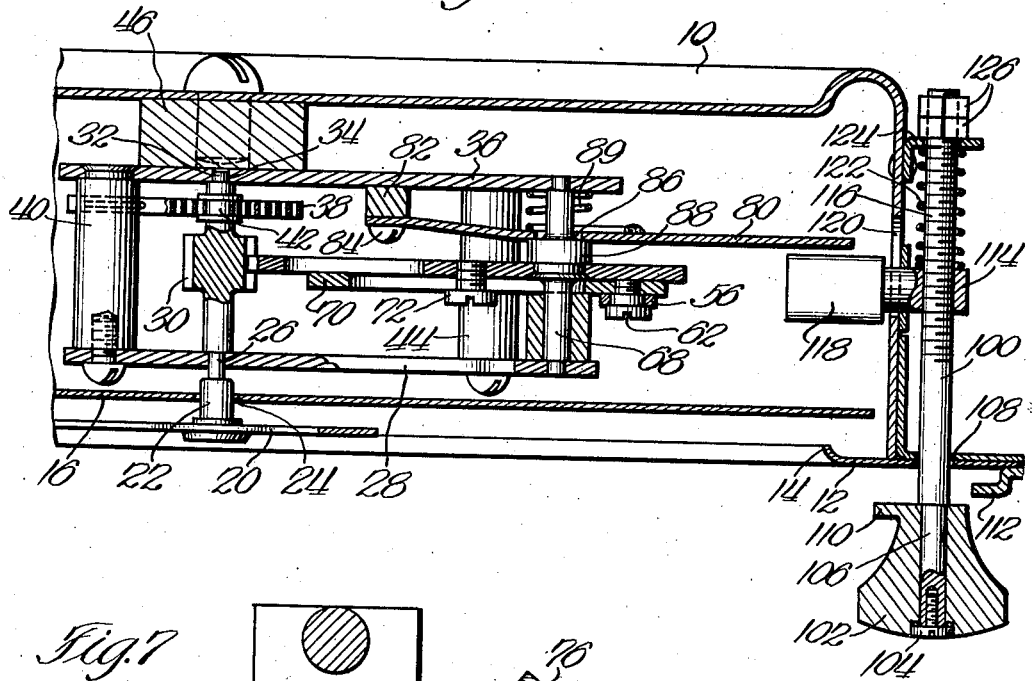
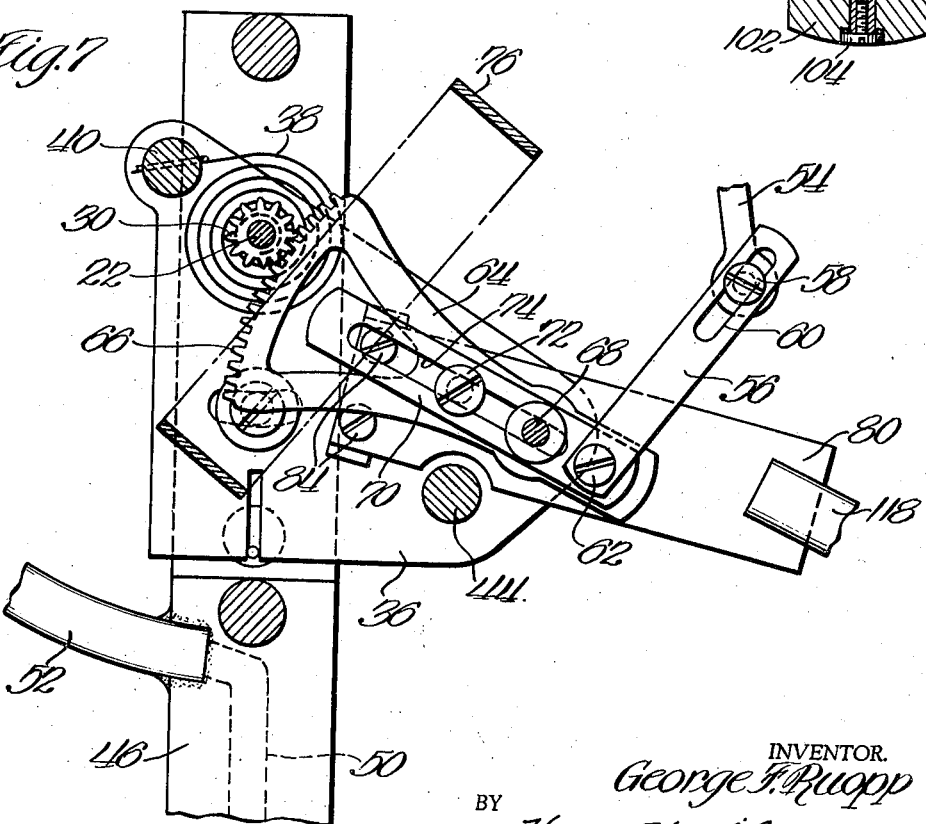
INVENTOR.
George F. Ruopp
BY
Harry H. Hitzeman
ATTORNEY.

Patented Dec. 3, 1940

2,223,579

UNITED STATES PATENT OFFICE 2,223,579

DOUBLE PURPOSE SINGLE POINTER GAUGE

George F. Ruopp, Marshalltown, Iowa, assignor to Marshalltown Manufacturing Company, a corporation of Iowa Application March 18, 1938, Serial No. 196,606

4 Claims. (Cl. 73—109)

My invention relates to improvements in gauge construction.

My invention relates more particularly to a new type of gauge construction in which a single pointer is adapted to be used for either indicating a pressure and then returning to zero, or for indicating a maximum pressure and remaining in the maximum pressure indication position until manually released.

One of the many uses for a pressure gauge which has a dual purpose single pointer indicator is in connection with brake testing machines. The indicator is adapted to be used as a regular gauge to test the centricity or "out of true" of the brake drums. Any other type of single action gauge is however satisfactory for this purpose. But after the brake drums have been tested and corrected, it is then necessary to test each wheel individually on a so-called maximum pressure pot and equalize the pressure required on all of the wheels. In the past this has been done by using a single pointer gauge which would register the maximum pressure required to stop the brake on a wheel, and when the pressure was released the indicator would immediately go back to zero. However, it has been found useful to use several of the dual purpose single pointer gauges which I have invented so that the reading may be kept when a single brake is being tested and in this manner the brakes on all four of the wheels can be adjusted to the same pressure requirements in a minimum amount of time.

A further object of the present invention is to provide an improved dual purpose single pointer gauge of the type described that is easily and simply constructed and one which will give long use under severe conditions without becoming broken or out of order.

A further object of the invention is to provide an improved dual purpose single pointer gauge of the type described provided with simple manual means located to one side of the dial indicator for transferring the same to either a single purpose pointer gauge or a double purpose pointer gauge. It is to be distinctly understood, however, that the control means may be located in the rear, on the side or even remotely from the gauge, and in some instances the same may even be capable of mechanical control instead of manual.

A further object of the present invention is to provide means capable of cooperating with the actuating means for the pointer or indicator capable of accurately and fixedly holding the same to indicate the highest pressure to which the gauge has been subjected.

Other objects and advantages will be more apparent from the following description wherein reference is had to the accompanying three sheets of drawings, upon which Fig. 1 is a front elevational view of a pressure gauge constructed in accordance with my invention;

Fig. 2 is a side elevational view of the same looking from the right and showing the manual operating means for transferring the gauge from a single to a double purpose gauge;

Fig. 3 is a fragmentary view taken on the lines 3—3 of Fig. 2 showing the cam member employed to change the gauge from a single to a double purpose gauge;

Fig. 4 is a vertical sectional view of the gauge pointer actuating mechanism and is taken generally on the line 4—4 of Fig. 2;

Fig. 5 is a vertical sectional view of the same elements taken generally on the line 5—5 of Fig. 4;

Fig. 6 is an enlarged fragmentary view of a portion of the mechanism including the manual member for changing the gauge from a single to a double purpose type gauge, and Fig. 7 is a fragmentary sectional view of the pointer shaft and associated parts taken generally on the line 7—7 of Fig. 5.

In the embodiment of my invention which I have chosen to illustrate I have provided a housing 10 provided upon its forward side with a ring member 12 securely fastened to the housing 10 and provided with a cylindrical opening 14. The dial 16 of the gauge may be positioned directly behind the ring member 12. The dial 16 may be provided with any desirable type of indicator scale, and for convenience in illustrating and describing the invention I have shown a scale 18 which has a reading from zero to 1500 and may indicate air pressures from zero to 1500 pounds. The pointer or indicator 20 is mounted upon a vertical shaft 22 which passes through an axial opening 24 in the dial 16. The shaft 22 may be formed with a reduced portion 26 extending through a bearing 28, a pinion portion 30 and a reduced portion 32 supported in an opening 34 in another support member 36. In its normal operation a hair spring 38 which has one end connected to a rigid post 40 and the other end connected to the portion 42 of the shaft 22 tends to maintain the pointer at its zero point when not in operation. The frames 28 and 36 together with their post members 40 and 44 are adapted to be connected to and support the indicator needle and its operating mechanism on the upright post 46 in the housing.

The gauge of my invention may be of the usual type including the hollow post member 46 provided at its lower end with a screw-threaded portion 48 so that the same may be secured to a conduit subject to air or other fluid pressure. A passageway 50 extends through the interior of post 46 and communicates with the usual Bourdon tube 52 which is provided with a link member 54 at its opposite end. It is of course understood that the lower end 52a of the Bourdon tube is rigidly connected to the post 46 and in communication with the conduit 50.

In its normal portion when fluid under pressure passes through the conduit in which the post 46 is mounted, the Bourdon tube will flex outwardly, depending upon the pressure in the conduit. This action is communicated through a link 56 that is connected by a pin 58 in the end of link 54. The pin 58 may be mounted in a slot 60 so that only upon outward movement of link 54 will any action be communicated to the link 56. The link 56 is connected by a screw member 62 to one end of a segmental gear 64 formed with an arcuate row of gear teeth 66 adapted to mesh with the teeth of the pinion 30. The segmental gear may be pivoted upon a post 68 rigidly held in position between the two frame members 28 and 36. To permit adjustability in the desired movement of the segmental gear the lever 56 is pivotally connected by the screw 62 to a flat bar 70 secured to the face of the segmental gear 64 by a screw member 72. This screw may pass through an elongated slot 74 to permit back and forth adjustment to control the desired movement of the gear teeth 66. A U-shaped guard member 76 may be secured upon the outside of frame 28 to generally limit the movement of the segmental gear 64.

As thus far described my gauge may be generally similar to those at present upon the market. With the above mentioned construction, when fluid passes through a conduit to which the post 46 is attached, by the action of the Bourdon tube and associated parts, the indicator will indicate the pounds per square foot pressure or any other desired pressure depending upon the purpose for which the gauge is utilized. In order, however, to hold the pointer or indicator 20 at the maximum pressure passing through the conduit I have provided a friction contact member 80. This member may be fixedly positioned upon the outer frame member 36 by a spacer 82 and suitable screw members 84. It may extend outwardly and have an enlarged opening 86 through which a portion of the pivot pin 68 of the segmental gear passes. The pivot pin may have an enlarged portion 88 against which the side of the friction bar 80 is adapted to rest. A coiled spring member 89 normally holds the friction bar 80 against the enlargement 88 of the pivot 68 so that when the indicator needle has been brought around to indicate a certain pressure in the conduit, the frictional contact between the bar 80 and the enlarged portion 88 of the pivot 60 will be greater than the action of the hair spring 38 and will thus hold the indicator or pointer 20 at the maximum pressure in the line in which the gauge is mounted.

As previously indicated, it is sometimes desirable to use the gauge in the usual manner without holding the pointer at the maximum pressure indication. In order to accomplish this, I have provided a rod member 100 provided with a handle 102 secured by a cap screw 104 upon a reduced front end 106 of the rod 100. The rod may extend through a suitable opening 108 in the front ring member 12 and the handle or knob 102 may be in front of the ring member. The handle 102 is provided with a cam sector portion 110 and the ring member 12 is provided with a lip member 112 having a lip spaced away from the face thereof. The rod 100 may have a post 114 mounted upon the screw-threaded portion 116 thereof. The post 114 carries a block 118 inside of the housing 10 and adjacent the front face of the friction plate 80. The post 114 is adapted to pass through an elongated slot 120 in the side of housing 10. A coiled spring member 122 placed between the post 114 and an outwardly turned lug 124 normally tends to hold the rod 100 in a forward position with the block 118 spaced away from the friction bar 80. Lock nuts 126 screw-threadedly mounted upon the rod 100 beyond the lug 124 limit the forward movement of the rod.

From the above description it will thus be apparent that when it is desired to use the gauge as a double purpose single pointer gauge the handle 102 is turned until the cam portion 110 has been moved from the confines of lip 112. The spring member moves the rod 100 outwardly, thus permitting the pressure plate 80 to bear against the pivot 68. In this position when fluid under pressure passes through a conduit on which the gauge is mounted, the exact pressure will be recorded and the pointer 20 will remain indicating this exact pressure. In order to permit the return of the indicator needle 20, it is thus necessary to move rod 100 back by grasping knob 102 thereon and placing the cam section 110 below the lip 112, thus moving the pressure plate 80 away from the pivot 68 and permitting the hair spring 38 to return the pointer to zero reading.

From the above and foregoing description it will be apparent to those skilled in the art that applicant has provided a comparatively simple, yet absolutely accurate and dependable dual purpose pressure gauge, one which may be used to indicate and give a fixed reading of maximum pressure or one which may be used in the usual manner of pressure gauges. By the manipulation of the handle 102 absolute control is obtained over the friction plate 80 to permit the use of the gauge in either manner.

While I have illustrated and described a specific embodiment of the invention, it will be apparent to those skilled in the art that changes and modifications may be made in the exact details shown, and I do not wish to limit myself in any particular; rather what I desire to secure and protect by Letters Patent of the United States is:

1. In a pressure gauge the combination of a cylindrically shaped housing having a forward open end, a circular dial disposed in said housing adjacent said forward open end, said dial having a scale about a portion of its periphery, an indicator positioned in front of said dial, a shaft for said indicator extending backwards into said housing axially thereof, a pinion on said shaft, a hair spring connected thereto for normally returning said indicator to its starting point, a segmental gear meshing with said pinion, a Bourdon tube means, a pivoted lever connected to said segmental gear and connected to said Bourdon tube, a friction plate adapted to normally bear against the side of said pivoted lever, spring means for urging said plate against said lever, a rod mounted on said housing having a handle in the front thereof, means for locking said handle in a position against the face of said housing and a block on said rod extending into said housing and adapted to bear against said friction plate to move the same away from engagement against the side of said pivoted lever.

2. In a pressure gauge the combination of a housing having a forward open end, a dial disposed in said housing adjacent said forward open end, said dial having a scale about a portion of its periphery, an indicator positioned in front of said dial, a shaft for said indicator extending backwards into said housing, a pinion on said shaft, a hair spring connected thereto for normally returning said indicator to its starting point, a segmental gear meshing with said pinion, a Bourdon tube means, a pivoted lever connected to said segmental gear and connected to said Bourdon tube, a friction plate adapted to normally bear against the side of said pivoted lever, spring means for urging said plate against said lever, a rod mounted on said housing having a handle in the front thereof, spring means normally urging said handle and rod forward, means for locking said handle in a position against the face of said housing and a block on said rod extending into said housing and adapted to bear against said friction plate to move the same away from engagement against the side of said pivoted lever.

3. In a fluid gauge the combination of a housing having an open end, a dial disposed in said housing adjacent said open end, said dial having a scale thereon, an indicator positioned in front of said dial, a shaft for said indicator extending into said housing, a pinion on said shaft, a hair spring connected thereto or normally returning said indicator to its starting point, a segmental gear meshing with said pinion, a Bourdon tube means associated with a conduit containing fluid under pressure, a pivoted lever connected to said segmental gear and connected to said Bourdon tube, a resilient plate adapted to normally bear against the side of said pivoted lever, a rod mounted on said housing having a handle in the front thereof, spring means normally urging said handle and rod forward, means for locking said handle in a position against the face of said housing and a block on said rod extending into said housing and adapted to bear against said plate to move the same away from engagement against the side of said pivoted lever.

4. In a fluid pressure gauge the combination of a housing having an open end, a dial disposed in said housing adjacent said open end, said dial having a scale thereon, an indicator positioned in front of said dial, a shaft for said indicator extending into said housing axially thereof, a pinion on said shaft, means connected to said shaft normally returning said indicator to its starting point, a segmental gear meshing with said pinion, a Bourdon tube means, a pivoted lever connected to said segmental gear and connected to said Bourdon tube, a friction plate adapted to normally bear against the side of said pivoted lever, spring means for urging said plate against said lever, a rod mounted on said housing having a handle in the front thereof, spring means normally urging said handle and rod forward, means for locking said handle in a position against the face of said housing and means on said rod extending into said housing and adapted to move said plate away from engagement against said pivoted lever.

GEORGE F. RUOPP.